Patented Sept. 4, 1951

2,567,108

UNITED STATES PATENT OFFICE 2,567,108

UNSUBSTITUTED ETHYLENE POLYMER COATING COMPOSITIONS

Seymore Hochberg, Upper Darby, Pa., assignor to E. I. du Pont de Nemours and Company, Wilmington, Del., a corporation of Delaware No Drawing. Application July 8, 1949, Serial No. 103,737

5 Claims. (Cl. 260—29.6)

This invention relates to coating compositions and, more particularly, to coating compositions containing polymers of unsubstituted ethylene.

U. S. Patent No. 2,153,553 describes a method of preparing polymers of unsubstituted ethylene. U. S. Patent No. 2,290,794 describes a method of preparing aqueous dispersions of such ethylene polymers.

Films of unsubstituted ethylene polymers may be prepared by applying aqueous dispersions of such polymers to suitable substrates and baking to form a continuous film. However, due to the waxy character of the polymers, such films do not possess a satisfactory degree of adhesion, according to paint, varnish, and enamel standards, when applied to relatively non-porous surfaces such as metal, glass and ceramics. It has been found that preliminary treatments and surface transformations, such as bonderizing and sandblasting, somewhat improve the adhesion of these polymer films, but the degree of adhesion is still not comparable to that of films of conventional organic coating compositions.

It is, therefore, a principal object of this invention to provide a liquid coating composition containing an unsubstituted ethylene polymer which, when applied to a substrate and fused into a continuous film, possesses a degree of adhesion to substrates which is comparable to that of conventional organic films.

Another object is to provide a liquid coating composition containing an unsubstituted ethylene polymer which possesses excellent adhesion to substrates and which is suitable for use as a base or primer coat for a succeeding coat or coats of other ethylene polymer-containing compositions and/or other organic coatings.

Other objects will become apparent as the description proceeds.

These objects are accomplished by incorporating chromic acid in an aqueous dispersion of an unsubstituted ethylene polymer.

The term "chromic acid" as used herein, is intended to include chromic anhydride (chromium trioxide $CrO_3$) and the hypothetical substance $H_2CrO_4$, and references to quantities of chromic acid are expressed in terms of the equivalent anhydride ($CrO_3$).

In a preferred embodiment of this invention, chromic acid is dissolved in water and the solution is added to an aqueous dispersion of an unsubstituted ethylene polymer and agitated until the mixture is uniform.

The following examples illustrate embodiments of this invention and are given by way of illustration only, the parts being by weight:

Example 1

An aqueous dispersion of an unsubstituted ethylene polymer of the following composition is prepared:

| | Parts |
|---|---|
| Finely divided unsubstituted ethylene polymer (molecular weight 10,000 to 20,000) | 680.0 |
| Long chain alkyl aryl polyether alcohol | 5.8 |
| Water | 1165.0 |
| | 1850.8 |

The long chain alkyl aryl polyether alcohol has a recurrent group of ether linkages terminated on one end by a hydroxyl group and on the other end by an alkyl substituted aryl group and is commercially available as "Triton N–100."

To this dispersion, the following solution:

| | Parts |
|---|---|
| Chromic acid | 25 |
| Water | 48 |
| | 73 | is then slowly added with constant agitation to insure uniform dispersion.

The final composition contains:

| | Parts |
|---|---|
| Unsubstituted ethylene polymer dispersion | 37.5 |
| Chromic acid solution | 9.4 |
| Water | 12.5 |
| | 59.4 |

The chromic acid constitutes about 17.5% by weight, based on the combined polymer and chromic acid content, and about 5.4% of the total composition which has a solids concentration of approximately 31%.

This composition, when sprayed on a metal panel and baked for 10 minutes at 392° F., produces a film which is strongly adherent to the panel and which forms an excellent undercoat for unsubstituted ethylene polymer topcoats containing no chromic acid.

An unsubstituted ethylene polymer coating composition containing no chromic acid applied to a similar metal panel and baked for 10 minutes at 392° F. has very poor adhesion by paint, varnish, and enamel standards.

Example 2

| | Parts |
|---|---|
| Finely divided unsubstituted ethylene polymer (molecular weight 10,000 to 20,000) | 220 |
| Oleic acid | 20 |
| Triethanolamine | 10 |
| Potassium hydroxide solution (5% in water) | 84 |
| Chromic acid | 95 |
| Water | 400 |
| | 829 |

The unsubstituted ethylene polymer is placed in a Banbury mill with steam passing through the jacket and rotors to keep the contents of the mill at approximately 203° F. and milled for 20 minutes until it is thoroughly plastic and resembles a very stiff taffy. The oleic acid is then added in 4-part portions alternated with 2-part portion additions of triethanolamine. These additions are made over a period of 20 minutes, after which the mass is milled for another 30 minutes to insure thorough incorporation. The potassium hydroxide is then added in 12 part portions over a period of 40 minutes. At the end of this time, the steam heat is cut off and the milling continued as the mill and contents slowly cool. During the first hour of this slow cooling process, 100 parts of water are added in small portions.

After the mass in the mill has cooled sufficiently to break to a fine cheese-like paste, it is milled for another 30 minutes, during which time another 100 parts of water are added. The mass is then cooled to room temperature by passing cold water through the block and rotors of the mill. The slurry is dumped from the mill and reduced slowly by stirring in the remaining 200 parts of water, after which 95 parts of chromic acid are added slowly with constant agitation to insure uniform disersion.

The chromic acid constitutes about 30% by weight, based on the combined polymer and chromic acid content, and about 11.5% of the total composition which has a solids concentration of approximately 42%.

The composition is then applied to a metal base and heated to at least 248° F. for about 15 minutes to form a continuous film of the coating and cause it to become firmly attached to the metal base.

In addition to the procedures outlined above, it is also possible to prepare suitable and useful coating compositions for the purposes of this invention by first preparing a solution of the unsubstituted ethylene polymer in an organic solvent and adding water together with suitable wetting agent, to the organic solution with agitation, thus forming a suspension of the polymer solution in water. The organic solvent is then removed by evaporation. Suitable wetting agents for this purpose are duodecane sulfonate or the wetting agents used in the above examples.

It is sometimes desirable to carry out the evaporation of the organic solvent at reduced pressure while stirring. The other ingredients, including the chromic acid, may be introduced into this suspension of the unsubstituted ethylene polymer without further treatment.

These compositions may be applied by any suitable means to any suitable substrate, but in all cases, it is necessary to heat the coated substrate to form a continuous film and effect a firm bond between the coating and the substrate.

Any wetting or dispersing agent may be used in the compositions of this invention, provided it is stable in the presence of the other ingredients. The wetting agent concentrations shown are not critical, but controlled amounts are helpful in adjusting the final compositions to yield optimum stability, application properties, appearance, and performance.

The solids concentration (total polymer and chromic acid) of the final composition and the polymer concentration may vary over a wide range.

The amount of chromic acid used may vary over a wide range of proportions. In the examples, there are illustrated compositions in which the chromic acid content constitutes 17.5% and 30% of the combined polymer and chromic acid content. It is to be understood, however, that the chromic acid may vary from 1% to 90% of the combined polymer and chromic acid content, and it is preferred to use from 10% to 70%.

If desired, modifying agents, such as pigments, varnishes, organic solvents, and other film-forming materials, may be added (provided they are compatible with and stable in the presence of the other ingredients), and they are useful in imparting color, or enhancing hiding power, or giving other properties to the compositions of this invention.

When applying the compositions of this invention to ferrous metal substrates, it is often advantageous to incorporate zinc phosphate dissolved in a solution of chromic acid.

When a composition of this invention has been applied and baked as described, the resulting film adheres tenaciously to the substrate to a degree not previously possible with coating compositions containing polymers of unsubstituted ethylene.

Furthermore, the adhesion is comparable to that of conventional synthetic organic enamels of the type commonly used on automobile bodies, refrigerator cabinets, and furniture.

The compositions of this invention are useful to improve adhesion in all cases where liquid coating compositions containing unsubstituted ethylene polymers are employed on relatively non-porous substrates and permit the use of such polymers in a manner similar to conventional liquid coating compositions. These uses include coating glass, ceramics, and metals (foil sheets, wires and cast or formed shapes). These compositions are also useful in impregnating glass fibers or glass cloth and in cementing them to substrates such as metal foil.

It is apparent that many widely different embodiments of this invention may be made without departing from the spirit and scope thereof; and, therefore, it is not intended to be limited except as indicated in the appended claims.

I claim:

1. A coating composition comprising 1-90% of chromic acid and 10-99% of a homopolymer of unsubstituted ethylene based on the combined chromic acid and homopolymer content.

2. A coating composition comprising chromic acid and an aqueous dispersion of a homopolymer of unsubstituted ethylene, the chromic acid constituting 1-90% of the combined chromic acid and homopolymer content.

3. The coating composition of claim 2 in which the chromic acid constitutes 10-70% based on the combined polymer and chromic acid content.

4. The coating composition of claim 2 in which the solids concentration of the total composition is about 50%.

5. A coating composition comprising chromic acid, zinc phosphate, and a homopolymer of unsubstituted ethylene, the chromic acid constituting 1-90% of the combined chromic acid and homopolymer content.

SEYMORE HOCHBERG.

REFERENCES CITED

The following references are of record in the file of this patent:

UNITED STATES PATENTS

| Number | Name | Date |
|---|---|---|
| 2,385,800 | Douty et al. | Oct. 2, 1945 |
| 2,461,966 | Davis | Feb. 15, 1949 |
| 2,483,835 | Manzer | Oct. 4, 1949 |

FOREIGN PATENTS

| Number | Country | Date |
|---|---|---|
| 581,279 | Great Britain | Oct. 7, 1946 |